UNITED STATES PATENT OFFICE.

FRANK ROBERTS, OF LIVERPOOL, ENGLAND, AND JOHN M. GIFFIN, OF HALIFAX, NOVA SCOTIA, CANADA.

CEMENTITIOUS MATERIAL FOR RECEPTACLE-CLOSURES.

1,343,282.  Specification of Letters Patent.  Patented June 15, 1920.

No Drawing.  Application filed February 11, 1918.  Serial No. 216,556.

*To all whom it may concern:*

Be it known that we, FRANK ROBERTS and JOHN M. GIFFIN, subjects of the King of Great Britain, residing at Liverpool, in the county of Lancaster and Kingdom of England, and Halifax, Nova Scotia, Canada, respectively, have invented certain new and useful Improvements in Cementitious Materials for Receptacle-Closures, of which the following is a specification.

This invention relates to an improved cementitious material, adapted, more especially, for producing or effecting a tight joint between contiguous surfaces, and more particularly for effecting a tight joint between a jar and a closure therefor. In other words, the invention relates to means for sealing the mouths of glass, earthenware or other vessels or receptacles for preserved foods, provisions or other articles which in order to preserve them from deterioration require to be hermetically sealed, and the object of the present invention is to produce such a cementitious material as will enable receptacles to be sealed in an air tight manner without the aid of solder. The material is especially applicable to receptacles wherein an annular space or chamber is provided between the closure and the body of the receptacle for the reception of the cement. The cement or sealing composition which forms the basis of this invention is composed of powdered rock lime (calcium oxid, anhydrous lime), and powdered rosin or resinous matter insoluble in water, and preferably one containing the elements of water combined with it as in the case of rosin. The powdered rock lime and rosin or the like are mixed together with a little water into a paste and packed into the space or chamber above referred to and then allowed to harden and set. The proportions are about five-eighths parts of rock lime to three-eighths parts of rosin.

The packed receptacle with the cement between the parts, will, of course, be subjected to the usual heat treatment, as is well understood by those skilled in the art, and the peculiar advantages arising from the use of this particular cement or sealing composition are as follows:

Rock or caustic lime when wet rapidly expands increasing very considerably in volume. Rosin at the heat of boiling water melts into a comparatively thin liquid. This liquid has generally two molecules of water, it being to a considerable extent oxidized resin oil. The lime seizes the elements of water with avidity, and becomes an impalpable powder which is at once saturated with the rosin and as the vessel cools it becomes as hard as a rock, while the stickiness of the rosin causes the cement to hold firmly and fast to the metal cover and the receptacle. This will entirely prevent air from entering into the receptacle.

What is claimed is,—

A cementitious material for effecting a tight joint between a jar and a closure therefor, consisting of a mixture of five-eighths parts of rock lime and three-eighths parts of rosin.

In witness whereof we have hereunto signed our names this tenth day of January, 1918, in the presence of two subscribing witnesses, respectively.

FRANK ROBERTS.
JOHN M. GIFFIN.

Witnesses to the signature of Frank Roberts:
G. C. DYMOND,
J. McLACHLAN.

Witnesses to the signature of John M. Giffin:
RICHARD H. WILLIAMS,
JOHN CLIWORTH.